Feb. 20, 1923.

F. KRUSE

SAUSAGE TWISTING MACHINE

Filed May 8, 1922

INVENTOR.
Ferdinand Kruse

BY

ATTORNEYS.

Feb. 20, 1923.
F. KRUSE
1,446,122
SAUSAGE TWISTING MACHINE
Filed May 8, 1922   3 sheets-sheet 3
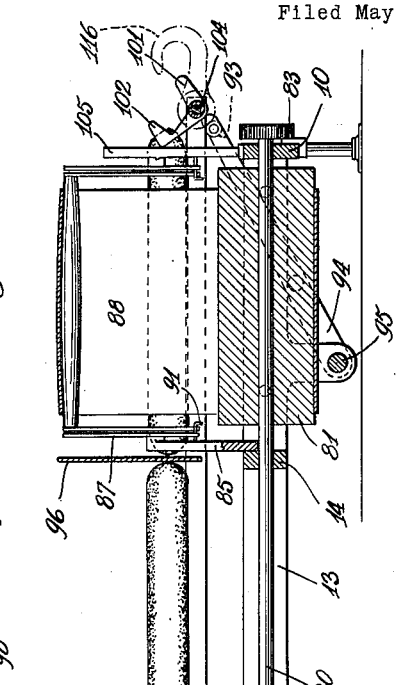
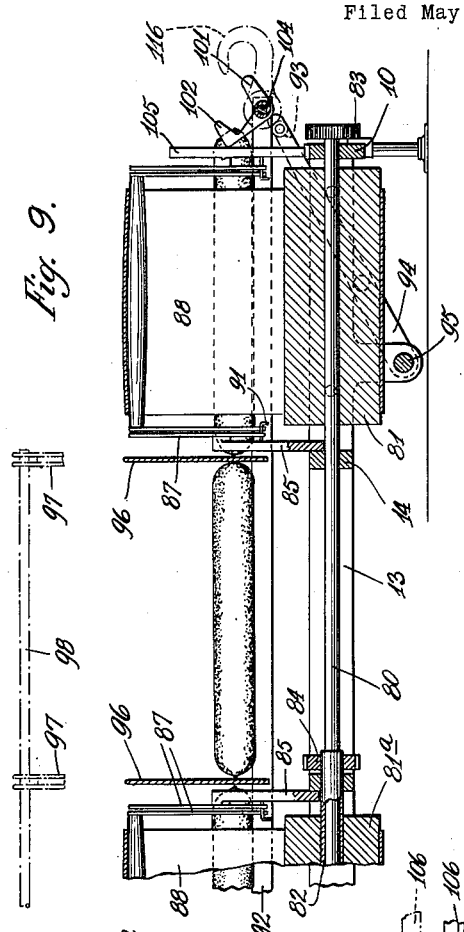
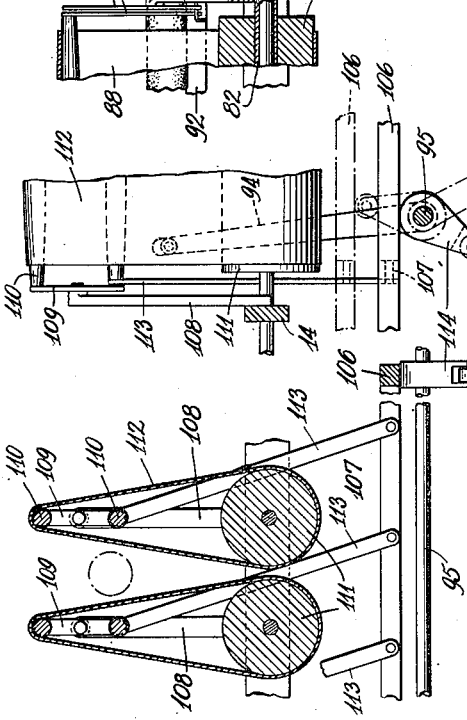
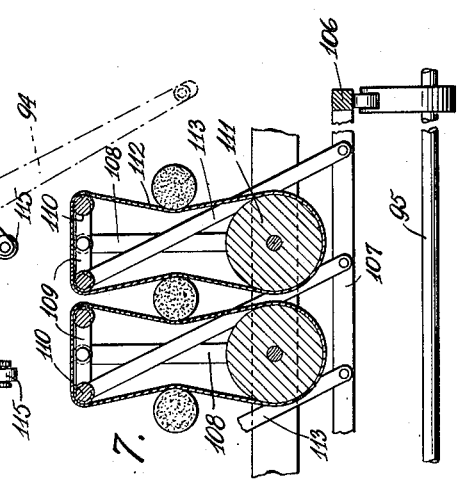
INVENTOR.
Ferdinand Kruse
BY
ATTORNEYS.

Patented Feb. 20, 1923.

1,446,122

UNITED STATES PATENT OFFICE.

FERDINAND KRUSE, OF PORT RICHMOND, NEW YORK.

SAUSAGE-TWISTING MACHINE.

Application filed May 8, 1922. Serial No. 559,156.

*To all whom it may concern:*

Be it known that I, FERDINAND KRUSE, a citizen of the United States, and resident of Port Richmond, in the county of Richmond and State of New York, have invented certain new and useful Improvements in Sausage-Twisting Machines, of which the following is a specification.

The principal object of this invention is to improve upon the sausage twisting machines disclosed in my prior applications for patent Serial No. 461,879, filed April 16, 1921, Serial No. 479,461, June 22nd, 1921 and Serial No. 528,623 January 12th, 1922.

Considered more specifically one of the objects is to provide a series of parallel belts and to have both vertical reaches of the belts in contact with the sausage casings, thereby avoiding the necessity for providing a pair of belts for each sausage link. A further object is to provide improved means for moving the working faces of the vertical reaches away from each other to admit or remove the sausage casings.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:

Fig. 6 is a sectional view similar to Fig. 2 showing a modification of the belt mounting means, the belts being shown in inoperative position.

Fig. 7 is a view of the structure shown in Fig. 5 with the belts in operative position.

Fig. 8 is a detail view of the means for operating the lifting carriage and the belt opening devices shown in Figs. 6 and 7.

Fig. 9 is a transverse section on the line 9—9 of Fig. 2, partially broken away and with the frame in its lowered position.

Fig. 10 is a view similar to Fig. 9 with the lifting frame in its upper position.

Figure 1:
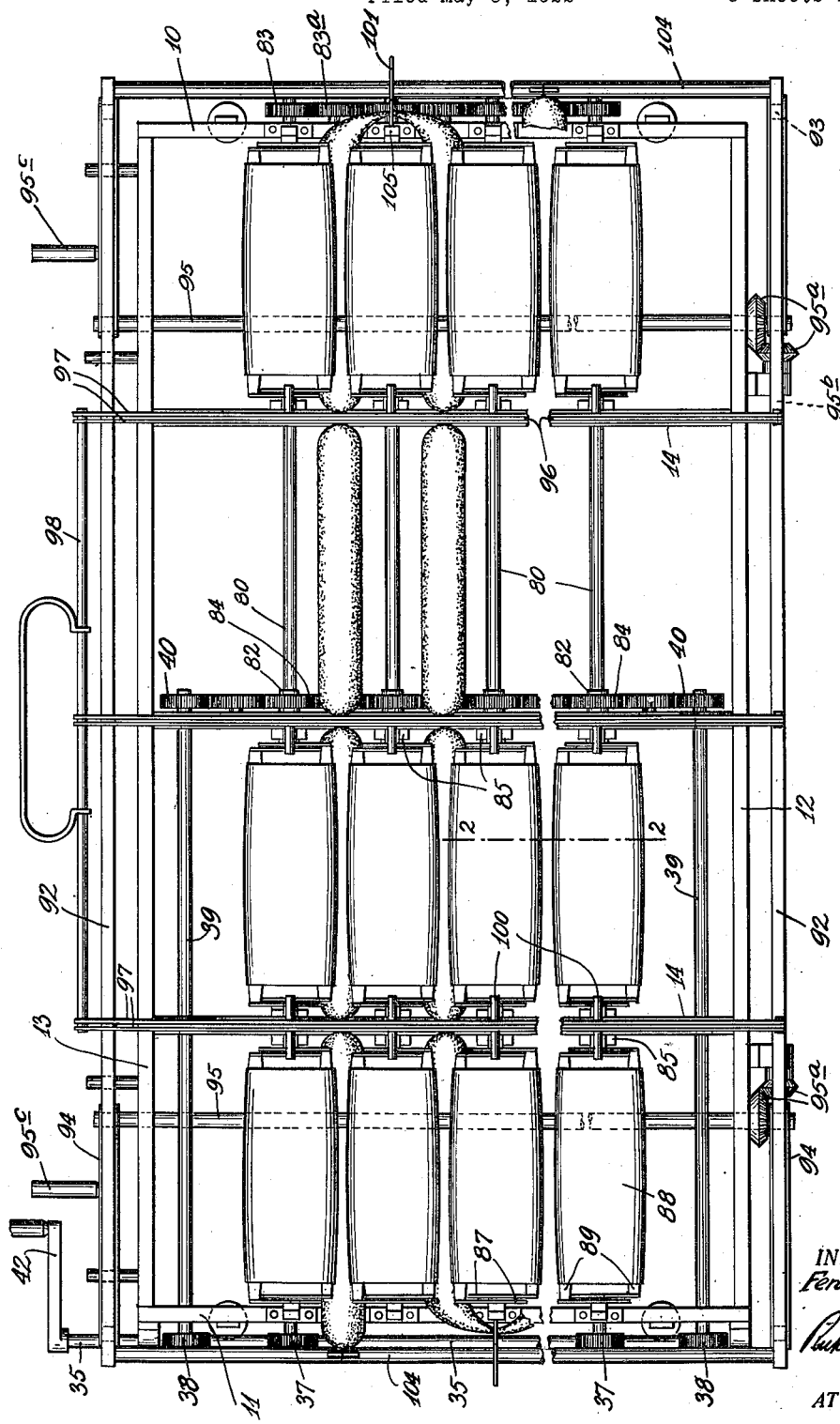
Fig. 1 is a top plan view of the machine.
Figure 2:
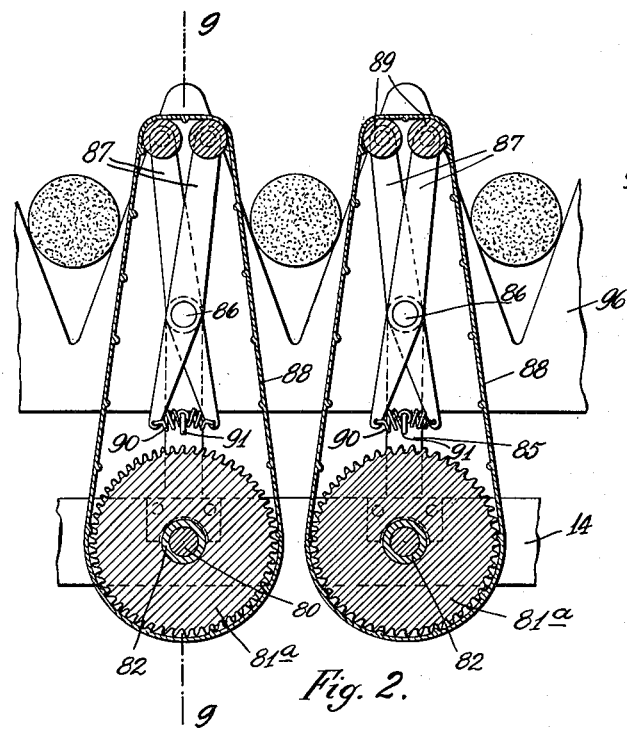
Fig. 2 is a sectional view on the line 2—2 of Fig. 1 showing a form of belt mounting means with the belts in inoperative position.

Referring to the drawings, the numerals 10 and 11 indicate the side members of the machine which are joined together at their ends by the end pieces 12 and 13, between which are secured a number of suitably spaced intermediate members 14. A plurality of spaced transverse shafts 80 are journaled in the side and intermediate members and to each of said shafts outside of the end member 10 is secured a spur gear 83, while between each of the spur gears a stub shaft is provided on each of which is mounted an idler gear 83ª. Secured upon the shafts 80 adjacent the side members 10 and 11 are the outer rollers 81, and mounted to turn loosely upon the shafts adjacent the centre of the machine are the sleeves 82 which are provided with the gears 84, and upon which are mounted the intermediate rollers 81ª.

An operating handle 42 is mounted upon the longitudinal shaft 35, which is provided with suitable gears to mesh with the gears 37 upon the ends of the shafts 80 adjacent the side frame members 11, similar gears 38 being secured to one end of the short transverse shafts 39 the other ends of which are provided with gears 40 which drive the chain of gears for the sleeves 82 and intermediate rollers 81ª. The gearing for the belt rollers and the means for operating the gearing just described is similar to that described and shown in Serial No. 528,623 heretofore referred to.

Referring to Figs. 2, 3, 9 and 10, it will be seen that there are secured along the intermediate members 14, in alignment with the shafts 80, a plurality of upwardly projecting brackets 85 on each of which is pivoted as at 86 a pair of scissor like arms 87 between the upper ends of which are rotatably mounted the upper rollers 89 around which and the the lower driving rollers are trained the belts 88. The lower ends of the arms 87 are normally held in closed position by the coil springs 90 secured as at 91 to the brackets 85.

A sausage lifting carriage is also provided and comprises the side members 104 and the end members 92. Secured to and extending between the end members 92 in spaced relationship are the stationary former blades 96 which are provided with a plurality of spaced V shaped notches arranged in alignment with the spaces between the vertical reaches of adjacent belts 88. Means for raising and lowering the carriage comprises the shafts 95 to each end of which in alignment with the end members 92 are secured the actuating arms 94 provided at their upper ends with the anti-friction rollers 93. The shafts 95 are connected to rotate in unison by means of the bevel gears 95$^a$ and the transverse shaft 95$^b$, handles 95$^c$ being secured to the shafts 95 for operating the lifting carriage.

Figure 4:
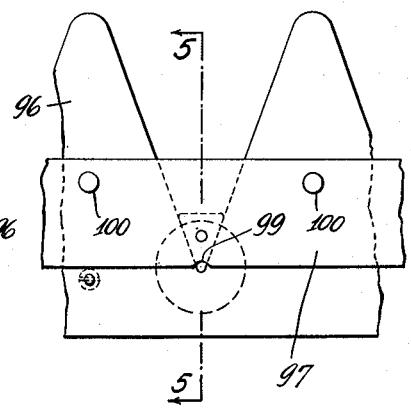
Fig. 4 is a detail of the cooperating former blades.
Figure 5:
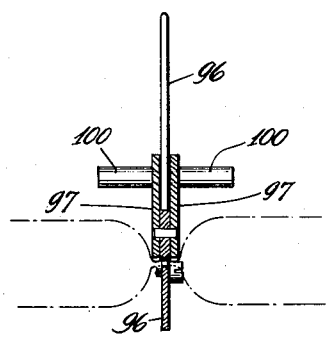
Fig. 5 is a section on the line 5—5 of Fig. 4.
Figure 3:
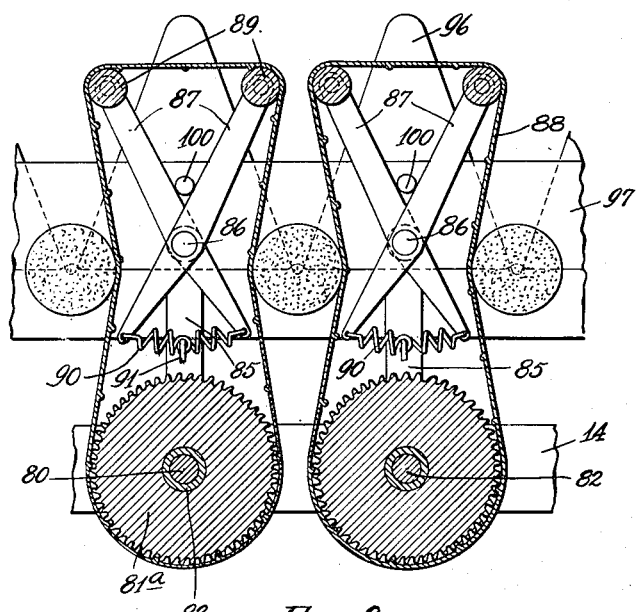
Fig. 3 is a view of the parts shown in Fig. 2 with the belts in operative position.

A plurality of movable former blades 97 are hinged to one of the end members 92 and are joined together in spaced relationship at their free ends by the rod 98. It will be noted by referring to Figs. 1 and 9 that the movable blades 97 are arranged in pairs which are adapted to straddle the stationary blades in close sliding contact. The blades 97 are preferably provided with small notches such as indicated at 99 (Fig. 4) for engaging the casings at the points of compression. In the modification shown in Figs. 1 to 5, each of the blades 97 has projecting therefrom a plurality of pins 100 which are adapted to engage between the upper parts of the scissor arms 87 and cause the arms to move outwardly to the position shown in Fig. 3, thereby causing the belts 88 to move into tight engagement with the casings.

Rotatably mounted on the side rods 104 of the lifting carriage are a plurality of former elements comprised of the hooked end portion 102 and the straight portion 101. The hooked portion 102 will normally rest because of its greater weight against a guide rod 105 secured to the side frame members 10 and 11. It will be noted that the end formers 101, 102 are arranged in alignment with alternate V notches in the blades 96 and in staggered relation on opposite sides of the machine. The purpose of this arrangement being obvious from an inspection of Fig. 1 showing the manner of threading the casing through the machine. The scissor arms 87 for the outer ends of the outer belts are mounted upon the arms 105.

The operation of the device shown in Figs. 1 to 5, 9 and 10 is as follows, the movable former blades being swung up to inoperative position out of engagement with the stationary blades, the sausage casing is threaded into the machine between the belts and around the end formers. The movable former blades are then brought down upon the casings, thus squeezing the chopped meat sideways and compressing the casing into the base of the V notches. The downward motion of the movable blades 97 will bring the pins 100 into contact with the scissor arms 87 thus moving the vertical reaches of the belts into firm but yielding contact with the casings. The handle 42 is then rotated a few times to operate the belts and twist the casings. After the casings have been twisted, the blades 97 are swung upwardly, the pins 100 moving out of contact with the scissor arms 87 allowing the springs 90 to close the arms 87 and open the belts. The handles 95$^c$ are then operated to raise the lifting carriage and move the sausages upwardly out of the belt spaces.

Referring to the modification shown in Figs. 6 and 7, the upper belt rollers 110 are mounted upon the pivoted arms 109, the arms 109 and rollers forming a rectangular frame pivoted at the central points of the arms 109 upon the brackets 108. The belts 112 are trained around the top rollers 110 and bottom rollers 111. Pivoted at its upper end to one end of each of the top roller frames is an operating link 113, the lower end of the rod being pivoted to the longitudinally extending rod 107 which extends between and is secured at its ends to the transverse end pieces 106. The rods 107 and end pieces form a vertically movable frame work which is supported by the cam members 114 secured to and adjacent each end of the shafts 95. It will be understood that an operating link 113 is provided for each of the top roller frames 109—110.

The operation of the modification shown in Figs. 6 to 8 is as follows. The sausage casings are threaded into the machine in the same manner as described in connection with Figs. 1 to 5, 9 and 10, after which the handles 95$^c$ are operated to lower the lifting carriage. As the belts 112 must remain open until the casings have been lowered, the arms 94 and cam members 114 are secured upon the shaft 95 in the relative positions shown in Fig. 8. The first movement of the shafts 95 will move the parts 94 and 114 from the full line position, Figs. 6 and 8, so as to lower the lifting carriage and move the casings downwardly into the spaces between the belts, the frame 106, 107 remaining in its lower position in which position the frames 109, 110 will be vertical and the belts open. The continued rotation of the shafts 95 will bring the cam rollers 115 into contact with the end pieces 106 thus raising the frame 106, 107 and through the operating links 113 swinging the frames 109, 110 into horizontal position as shown in Fig. 7, thus closing the belts upon the casings, this position corresponding to the dotted line position of the parts 94, 106, 114, shown in Fig. 8. After the casings have been twisted, the shafts 95 are then rotated in the opposite direction to return the parts to the position shown in Fig. 7.

A hook 116 such as shown in the dot and dash lines in Fig. 8 may be provided for hanging the lifting carriage, upon which the casings are secured between the blades 96 and 97, in the smoke house.

The end formers 101, 102 which are the same for each modification will be held in the operative position shown in Fig. 8 by the guide members 105 when the lifting carriage is lowered and will swing inwardly to the position shown in Fig. 10 when the carriage is raised thus permitting the casings to be readily removed when the twisting operation is completed.

Having thus described my invention, what I claim as new and desire to secure by Letters Patent of the United States, is:—

1. In a sausage twisting machine, a plurality of endless belts arranged in spaced relationship to provide a space between the reaches of adjacent belts, a pair of idler rolls and a driving roll about which said belts are trained, means for normally urging said idler rolls towards each other whereby the spaces between adjacent belts is increased and means for forcing said idler rolls away from each other whereby the said spaces are decreased.

2. In a sausage twisting machine, a plurality of endless belts arranged in spaced relationship to provide a space between the reaches of adjacent belts, a pair of idler rolls and a driving roll about which said belts are trained, resilient means for normally urging said idler rolls towards each other whereby the spaces between adjacent belts is increased and means for forcing said idler rolls away from each other whereby the said spaces are decreased.

3. In a sausage twisting machine, a plurality of endless belts arranged in spaced relationship to provide a space between the reaches of adjacent belts, a pair of idler rolls and a driving roll about which said belts are trained, pivotal mounting means for said idler rolls, resilient means to actuate said pivotal mounting means and normally urge said idler rolls toward each other and means to actuate said pivotal mounting means to cause said idler rolls to be forced away from each other.

4. In a sausage twisting machine, a plurality of endless belts arranged in spaced relationship to provide a space between the reaches of adjacent belts, a pair of idler rolls and a driving roll about which said belts are trained, a pair of pivotally mounted scissor arms upon which said idler rolls are mounted, means for normally closing said scissor arms, and means for opening said scissor arms.

5. In a sausage twisting machine, a plurality of endless belts, a pair of relatively movable former elements adjacent the sides of said belts, a pair of idler rolls and a driving roll for each of said belts about which said belts are trained, means for normally urging said idler rolls towards each other and means carried by one of said former elements for forcing said idler rolls away from each other.

6. In a sausage swisting machine, a plurality of endless belts, a pair of relatively movable former elements adjacent the sides of said belts, a pair of idler rolls and a driving roll for each of said belts about which said belts are trained, resilient means for normally urging said idler rolls towards each other and means carried by one of said former elements for forcing said idler rolls away from each other.

7. In a sausage twisting machine, a plurality of endless belts, a pair of relatively movable former elements adjacent the sides of said belts, a pair of idler rolls and a driving roll for each of said belts about which said belts are trained, pivotal mounting means for said idler rolls, resilient means to actuate said pivotal mounting means, and normally urge said idler rolls towards each other, and means carried by one of said former elements for forcing said idler rolls toward each other.

8. In a sausage twisting machine, a plurality of endless belts, a pair of relatively movable former elements adjacent the sides of said belts, a pair of idler rolls and a driving roll for each of said belts about which said belts are trained, a pair of pivotally mounted scissor arms upon which said idler rolls are mounted, means for normally closing said scissor arms and means carried by one of said former elements for opening said scissor arms.

9. In a sausage twisting machine, a plurality of endless belts, fixed former elements adjacent the sides of said belts, movable former elements cooperating with said fixed former elements, a pair of idler rolls and a driving roll for each of said belts about which said belts are trained, pivotal mounting means for said idler rolls, means for actuating said pivotal mounting means to normally urge said idler rolls towards each other and means projecting from said movable former elements adapted to engage said pivotal mounting means and force said idler rolls away from each other.

10. In a sausage twisting machine, a plurality of endless belts, fixed former elements adjacent the sides of said belts, movable former elements cooperating with said fixed former elements, a pair of idler rolls and a driving roll for each of said belts about which said belts are trained, pivotally mounted scissor arms upon which said idler rolls are mounted and means carried by and projecting from said movable former elements to engage between said scissor arms and force said idler rolls towards each other.

11. In a sausage twisting machine, a plurality of endless belts, fixed former elements adjacent the sides of said belts, movable former elements cooperating with said fixed former elements, a pair of idler rolls and a driving roll for each of said belts about which said belts are trained, pivotally mounted scissor arms upon which said idler rolls are mounted, means for normally closing said scissor arms, and means carried by and projecting from said movable former elements to engage between said scissor arms and force said idler rolls towards each other.

12. In a sausage twisting machine, a plurality of endless belts, a sausage lifting carriage, and former elements carried by said lifting carriage adjacent the sides of said belts.

13. In a sausage twisting machine, sausage twisting means, former elements adjacent said twisting means comprising a fixed former blade, and a pair of cooperating movable former blades spaced to pass in sliding contact with and upon opposite sides of said fixed blade.

14. In a sausage twisting machine, sausage twisting means, former elements adjacent said twisting means comprising a fixed former blade provided with a plurality of spaced V shaped notches, and a cooperating movable former blade having a plurality of notches adapted to be brought into alignment with said V shaped notches.

15. In a sausage twisting machine, sausage twisting means, a sausage lifting carriage comprising end and side members, and end formers rotatably mounted on said side members.

16. In a sausage twisting machine, sausage twisting means, a sausage lifting carriage comprising end and side members, end formers rotatably mounted on said side members, said end formers having a hooked end portion adapted to engage and compress a sausage casing.

Signed at New York, in the county of New York and State of New York, this 4th day of May, A. D. 1922.

FERDINAND KRUSE.